Figure 1:
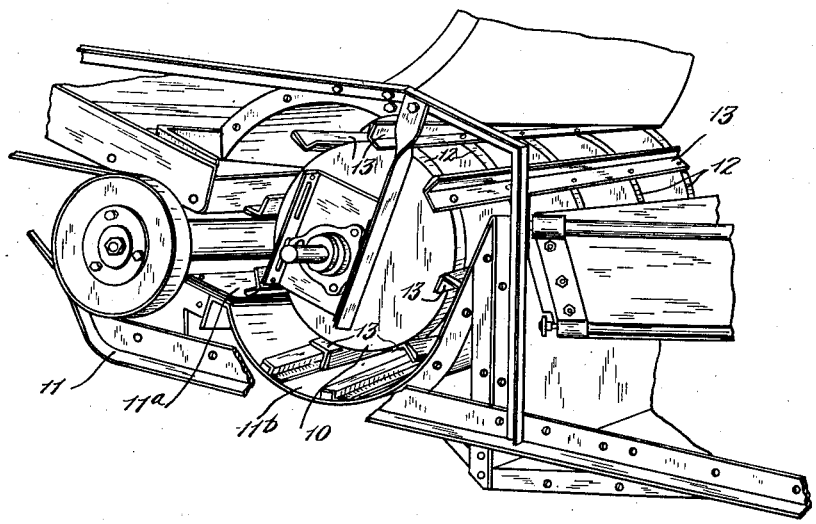

Aug. 20, 1940.     J. F. McWHORTER     2,212,300
BEATER BAR FOR COMBINE CYLINDERS
Filed Jan. 29, 1940     2 Sheets-Sheet 1

INVENTOR.
JOHN F. McWHORTER
BY
Kuris Hudson & Kent
ATTORNEYS

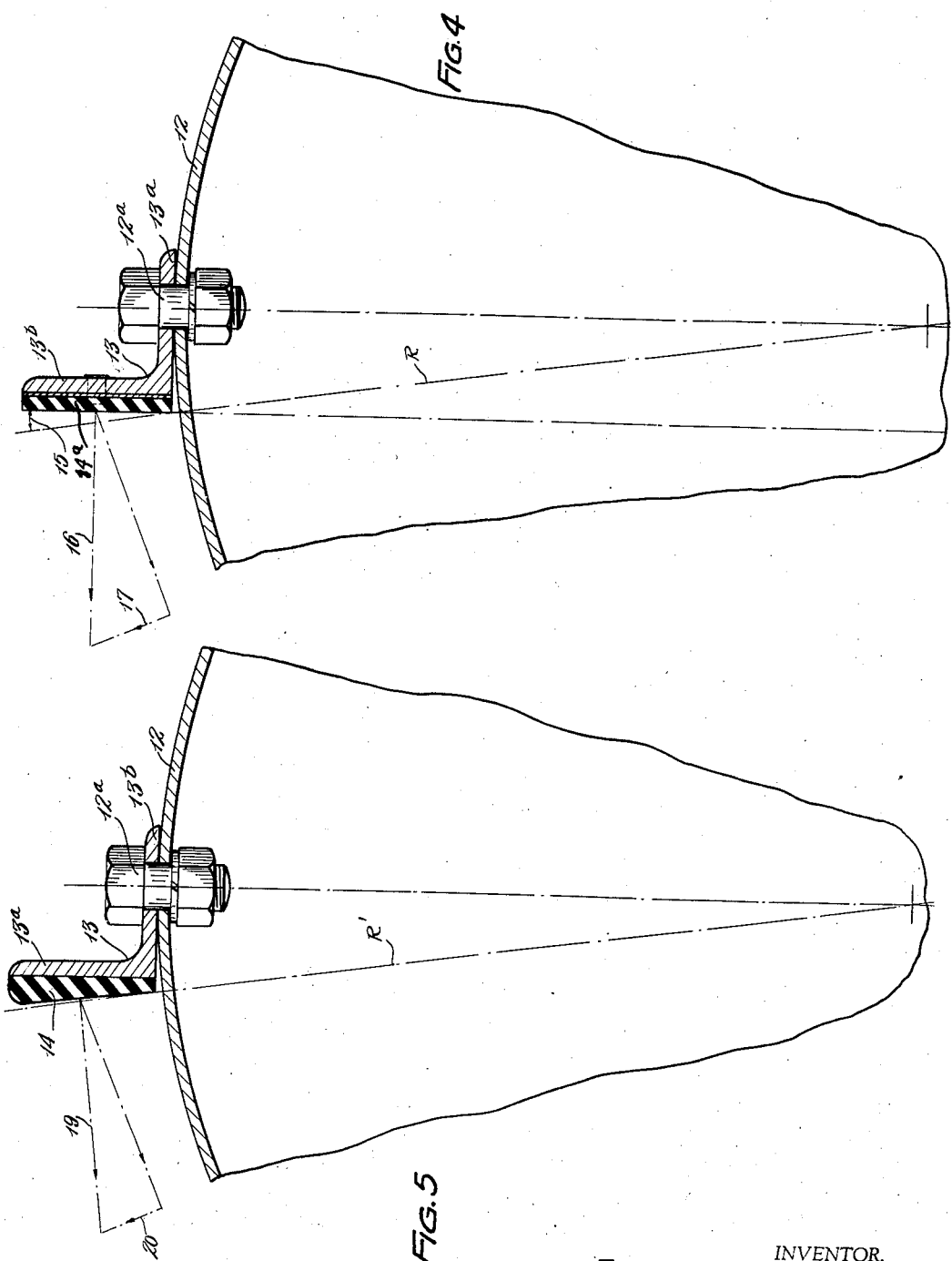

Patented Aug. 20, 1940

2,212,300

UNITED STATES PATENT OFFICE 2,212,300

BEATER BAR FOR COMBINE CYLINDERS

John F. McWhorter, Willoughby, Ohio, assignor to The Ohio Rubber Company, Willoughby, Ohio, a corporation of Ohio Application January 29, 1940, Serial No. 316,208

4 Claims. (Cl. 130—27)

This invention relates to harvesters, and particularly to the so-called combines sometimes referred to as "all crop harvesters" utilizing a rotating cylinder with longitudinally extending peripheral beater bars for separating grain, legumes, and the like from the heads of pods. This application is a continuation in part of my prior application Serial No. 234,418 filed October 11, 1938.

The threshing cylinder of a combine consists of a series of axially spaced circular disks with laterally turned flanges and the beater bars are in the form of angles with their sides at right angles to each other, each angle having one side secured by short radially disposed bolts to the flanges of the disks. The other side of the angle which is the side effective in the threshing operation extends outwardly in a plane forwardly of the bolts which attach the angles to the disks and the front or leading face of this side of the angle has been customarily faced with rubber. The purpose of the rubber is to provide a cushioning action on the grain and thus reduce the damage to the seeds being harvested. This cushioning action is of considerable importance, as will be readily apparent when consideration is given to the fact that to obtain efficient results the cylinder must be rotated at high speed frequently and for many types of seeds being harvested at approximately 1600 R. P. M.

Prior to the present invention it was customary to apply to the outstanding side of each angle a layer of rubber of uniform thickness. This was done by vulcanizing a strip of rubber to a thin strip of sheet steel and securing the composite strip of rubber and metal to the angle by a series of rivets spaced a few inches apart. As the rubber layers were previously made and applied to the outwardly extending sides of the angles, the beater bars had the serious disadvantage that they had to be replaced quite frequently because of the excessive wear by reason of the abrasive action of the dust, sand, and grain. The cost of new beater bars and the labor involved in replacing the worn bars with new ones added considerably to the cost of operation and the upkeep of the combine.

A further disadvantage of the beater bars as heretofore constructed resided in the fact that the leading face of the rubber-covered side of the angle was pitched back from the radial plane passing outwardly through the lower edge of the rubber face, with the result that the radial or outward component of the air force created by the blower action of the blades was unduly great particularly at the higher speeds of operation. This was particularly disadvantageous when small seeds such as timothy, clover, canary grass, English blue grass, and other light seeds were being harvested. This resulted in part of the seeds being blown back along the feeding conveyor and necessitated a reduction in the speed of rotation of the cylinder to a speed less than that required for the highest efficiency in threshing.

The principal object of the present invention is to improve the efficiency and life of the beater bars. This object is attained by securing to the outstanding side of each angle of the various beater bars of the cylinder a layer of rubber which increases in thickness from the inner edge of the side to the outer edge thereof with sufficient taper or angle of the leading face of the rubber with respect to its inner face or to the side of the angle to which it is attached (preferably by vulcanization) that the backward pitch of the leading face is wholly or substantially wholly eliminated, thus materially reducing the radial component of the air force and at the same time providing a greater thickness of rubber where the greatest wear occurs and where the greatest cushioning action is needed.

The invention may be further briefly summarized as consisting in certain novel details of construction and combinations and arrangements of parts which will be described in the specification and set forth in the appended claims.

Figures 2, 3:
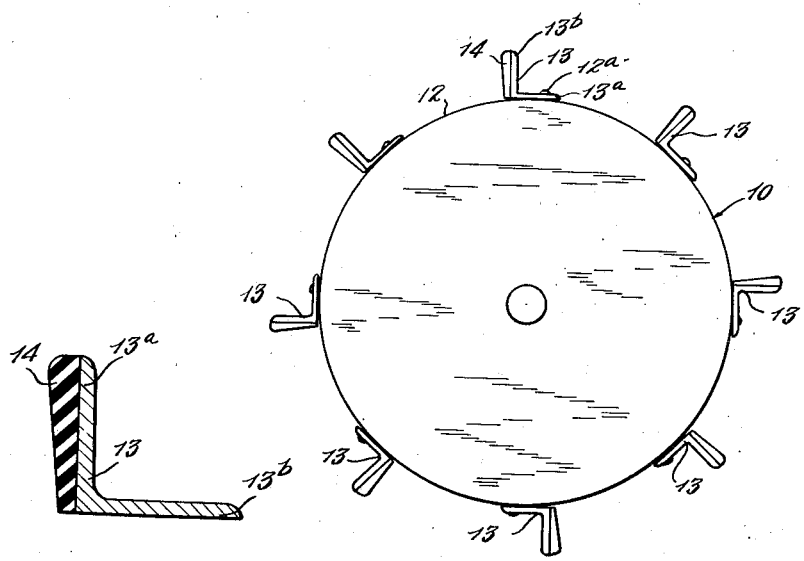

In the accompanying sheets of drawings showing the preferred embodiment of the invention, Fig. 1 is a fragmentary perspective view of a portion of a combine with a cylinder having angle-shaped beater bars improved in accordance with my invention;

Fig. 2 is an end view of the cylinder on an enlarged scale;

Fig. 3 is an enlarged transverse sectional view of one of my improved beater bars detached from the cylinder; and Figs. 4 and 5 are enlarged transverse sections of beater bars attached to fragments of the cylinders, Fig. 4 showing the prior construction and Fig. 5 the improved construction with the rubber arranged in accordance with the present invention, both views being somewhat diagrammatic and illustrating the comparative radial components of the air force of the blower action created by the two constructions.

Referring now to the drawings, 10 represents the rotatable cylinder to which grain or the like is fed and which cooperates with the relatively stationary part of the machine designated 11 to effect the separation of the seeds from the heads or pods. A machine of this general type is well known and the means for rotating the cylinder and the manner of feeding the grain, as well as the details of the relatively stationary portion 11 of the machine, are immaterial to the present invention and need not be described in detail. It will be sufficient to state that the cut grain passes over an adjustable ledger plate 11a into a threshing chamber 11b in which the cylinder is rotated. The beater bars strike the grain as it passes into the chamber 11b over the ledger plate and the threshing action is continued by the action of the bars on the grain in conjunction with bars in the base of the chamber 11b. As a matter of fact, the cylinder itself may be formed in different ways but generally consists of a series of disk 12 to the peripheries of which are secured, usually by short bolts 12a, longitudinally extending beater bars 13 here shown as angular in cross-section, the angles each having one side 13a adapted to be secured to the disks 12 and an outwardly extending side 13b which is the active or working part of the bar. Combines are generally made in two or more sizes but for all sizes the diameter of the cylinder remains the same and it is varied in length only. The disks are stamped from sheet metal and have laterally extending flanges to which the sides 13a of the angles are bolted. The beater bars may extend in straight lines axially along the periphery of the cylinder or they may be somewhat diagonally disposed as indicated in Fig. 1, but whether they are disposed diagonally or axially is immaterial to the present invention.

Coming now to the feature involving the present invention, it will be noted that on the front or advancing face of the outstanding side 13b of each angle-shaped beater bar I provide a layer of rubber designated 14 in Figs. 1, 2, 3, and 5. The rubber layer 14 preferably extends the full length of the beater bar and is vulcanized directly to the side 13b of the latter. To accomplish this, the angle irons are first degreased and pickled to remove oil and scale, and to obtain good adherence between the rubber and the metal, a good grade of rubber cement is applied to the metal or rubber just prior to the vulcanizing operation, or previous to the vulcanizing operation the bars may be brass-plated or treated with copper sulphate, so that regardless of the rough treatment to which the beater bars are subjected the rubber will not become loose or break off from the bars. As the purpose of the rubber is to provide a yielding working face on each bar, the rubber, after vulcanization, is semi-soft and elastic. A good grade of rubber is preferably employed, with the result that, by treating the bars in the manner stated above and by the use of rubber cement or equivalent means and subsequently vulcanizing the rubber to the bar in a properly shaped vulcanizing mold, a highly effective and durable union or adhesion is obtained between the rubber and the metal, as stated above.

The rubber layer 14 extends not only the full length of the side 13b of the bar but also from its inner edge to its outer edge and is of gradually increasing thickness from the inner edge to the outer edge of the side of the angle. There is thus provided a greater thickness of rubber where the greatest wear occurs and where the maximum cushioning action is desired, i. e., toward the outer part of the bar, and this result is obtained without materially increasing the amount of rubber employed and without greatly increasing the action of centrifugal force on the rapidly rotating bar when in use.

The taper of the outer face of the rubber layer or the angle between the outer and inner faces thereof is of considerable importance although, as will appear subsequently, the angle may be varied somewhat without materially affecting the results. In Figs. 3 and 5 wherein my invention is shown on a full size scale with the rubber and metal in their true proportions, the angle between the inner and outer faces of the rubber layer 14 is approximately 6°. Each side of the angle is 1¼" in width and the 6° angle is obtained by making the thickness of the rubber at the outer edge of the angle approximately 3/32" greater than the thickness at the inner edge. In this instance, the rubber at the inner edge of the outstanding side of the angle is approximately ⅛" and the thickness at the outer edge of the angle is approximately 7/32". The latter dimensions need not be adhered to for it is simply the increase in thickness of the rubber in going from the inner edge to the outer edge which determines the angle.

The importance of the angle between the inner and outer surfaces of the rubber will be obvious from a consideration and comparison of Figs. 4 and 5. In Fig. 4 I have shown the standard construction employed very extensively prior to the present invention. Here I have shown on an enlarged scale a portion of one of the disks 12 of the cylinder and one of the beater bars 13 in the exact relative sizes and proportions as heretofore used. In practice, the disks are 12¾" in diameter, and the angles 13 have 1¼" sides. The outer face of the outstanding side 13b of the angle is in practice displaced ¾" from the center or axis of the radial bolt 12a securing the angle to the flange of the disk. There is secured to the outer face of the outstanding side 13b of the angle a composite layer 14a of rubber and sheet metal approximately 5/32" in thickness, with the result that the outer or leading face of the rubber is pitched backward at an angle of approximately 8° (this angle is designated 15) from a radial plane designated R passing from the center of the cylinder through the lower edge of the leading face of the rubber. The backward pitch of about 8° mentioned above is the approximate average for the various beater bars of a cylinder and for the different cylinders of combines manufactured heretofore and sold in large numbers. It should be mentioned, however, that this angle varied somewhat due to lack of uniformity in the thickness of the rubber and also due to slight irregularities on the bars themselves or on the cylinder flanges to which the bars were attached.

It is a feature of the present invention as best illustrated in Fig. 5 that the angle between the inner and the outer faces of the layer 14 of rubber, that is to say, the angle between the leading face of the rubber and the outstanding side of the angle to which the rubber is vulcanized approximates the backward pitch of the leading face of the rubber of the construction shown in Fig. 4, but here again uniformity of the angle is in practice not possible to obtain due to factors which it is difficult to control including the tendency for the rubber to expand after the beater bar is removed from the vulcanizing mold and after the rubber is relieved of the pressure to which it is subjected in the vulcanizing operation. It is desirable that the angle be such that the leading face of the rubber does not have a forward pitch beyond the radial for otherwise the beater bar will not have the desired seed dislodging action on the cut grain that passes over the ledger plate. In other words, it is preferable that the angle be somewhat less than 8° rather than more than 8° and, accordingly, a variation of a few degrees from the full angle of 8° in a minus direction produces satisfactory results everything considered, and I regard within the scope of my invention an angle which varies from approximately 4° to approximately 8° or one which may slightly exceed 8° although, as stated above, it is preferable that the angle not exceed 8° and therefore that the leading face of the rubber be not pitched forwardly beyond the radial. In brief, I regard the expression "substantially radial" as applying to a beater bar whose leading angularly disposed rubber face is radial or slightly displaced from the radial preferably in a backward direction, as, for example, by approximately 1° to 4°. In Fig. 5 the radial plane passing from the center of the cylinder through the lower or inner edge of the leading face of the rubber layer 14 is designated R' and it will be noted that the angle between this radial plane and the leading face of the rubber layer is very small and that the leading face is "substantially radial."

In Figs. 4 and 5 the proportions so far as the cylinder, the metal part of the beater bar, and the attaching bolt are concerned, are identical. The constructions differ in the shape and manner of applying the rubber facings or layers, the construction shown in Fig. 4 being substantially as used prior to the present invention while the construction shown in Fig. 5 is substantially that which has superseded the construction shown in Fig. 4 and is being used extensively at the present time. These two figures show not only the difference between the prior and the present beater bars but also the advantage of the improved construction shown in Fig. 5 over the prior construction shown in Fig. 4 in obtaining a decrease in the radial component of the air force created or generated by the rotating bar. In Fig. 4 the direction and force of the air flow are indicated by the normal line designated 16 and the radial component of the air force is designated 17. In Fig. 5 the direction and force of the air flow are indicated by the normal line designated 19 and the radial component is designated 20. It will be observed that the radial component of the air face in Fig. 5 is considerably less than the radial component in Fig. 4 and in fact is substantially 25% less with my improved construction than with the former construction. As before stated, this reduction in the radial component of the air force is of considerable advantage when light seeds are being harvested and results in less loss of grain than heretofore and makes it less important that the speed rotation of the cylinder be reduced as heretofore found advisable.

While I have shown the preferred embodiment, I do not desire to be confined to the precise details shown either in the arrangement or in the distribution of the rubber or to the precise shape of the beater bars themselves. Furthermore, the term "rubber" is used herein as inclusive of artificial as well as natural rubber or equivalent yieldable material. I therefore aim in my claims to cover all modifications which do not involve a departure from the spirit and scope of the invention.

Having thus described my invention, I claim:

1. A beater bar for the cylinder of a harvesting machine, said bar having one side adapted to be secured to the bar supporting parts of the cylinder and having a side adapted to extend outwardly from the cylinder with its leading face pitched backward from the radial position, and a layer of rubber secured to said leading face of gradually increasing thickness from its inner edge to its outer edge, the inner and outer sides of the rubber layer being at an angle such that the leading face of the rubber is in a substantially radial plane when the bar is applied to the cylinder.

2. A beater bar for the cylinder of a harvesting machine consisting of an angle-shaped member having two sides at substantially right angles to each other, one of the sides having openings by which the bar is adapted to be secured to the bar supporting parts of the cylinder whereby the outstanding side of the cylinder is displaced from the radial, and a layer of rubber secured to said outstanding side and of gradually increasing thickness from the inner edge of said side to its outer edge, the angle between the inner and outer sides of the rubber being such that the leading face of the rubber is in a substantially radial plane when the bar is applied to the cylinder.

3. A cylinder for a harvesting machine having a plurality of beater bars extending longitudinally thereof, each bar having angularly disposed sides one of which is secured to the cylinder and the other of which extends outwardly therefrom, said last mentioned side having a layer of rubber secured thereto and of gradually increasing thickness from its inner edge to its outer edge, the leading face of the rubber layer being in substantially a radial plane.

4. A cylinder for a harvesting machine having beater bars extending longitudinally thereof, each bar having one side which is secured to the bar supporting parts of the cylinder and having a second side which is at right angles to the first and extending outwardly from the cylinder with its leading face offset backwardly with respect to the radial plane, and a layer of rubber secured to the leading face of said last mentioned side of the angle and of gradually increasing thickness from the inner edge of said side to its outer edge, the angle between the inner and outer sides of the rubber layer being such that the leading face of the rubber layer is substantially radial.

JOHN F. McWHORTER.